United States Patent [19]

Shibuya et al.

[11] Patent Number: 4,835,121
[45] Date of Patent: May 30, 1989

[54] INFRARED TRANSPARENT GLASS CERAMIC ARTICLES WITH BETA-QUARTS SOLID SOLUTION CRYSTALS WITHOUT ANY OTHER CRYSTALS

[75] Inventors: Takehiro Shibuya; Kazuhiro Matsui; Makoto Matsumoto, all of Shiga, Japan

[73] Assignee: Nippon Electric Glass Company, Limited, Otsu, Japan

[21] Appl. No.: 11,298

[22] Filed: Feb. 4, 1987

[30] Foreign Application Priority Data

Feb. 5, 1986 [JP] Japan .................... 61-22103

[51] Int. Cl.$^4$ ............................................. C03C 10/14
[52] U.S. Cl. ............................................. 501/4; 501/7
[58] Field of Search ............................. 501/4, 7

[56] References Cited
U.S. PATENT DOCUMENTS 4,211,820  7/1980  Cantaloupe et al. ................. 501/4
4,461,839  7/1984  Rittler ................................ 501/7

Primary Examiner—Mark L. Bell
Attorney, Agent, or Firm—Hopgood, Calimafde, Kalil, Blaustein & Judlowe

[57] ABSTRACT

An infrared transparent glass ceramic article is useful for top plates of cooking stoves and has a black appearance but an infrared transmittance of about 80% or more for an infrared light of a wavelength 1,500 nm, and $\beta$-quartz solid solution crystals substantially alone dispersed within glassy matrix without any other crystals. The article consists essentially, by weight, of 60–72% $SiO_2$, 14–28% $Al_2O_3$, 2.5–5.5% $Li_2O$, 0.1–0.9% $MgO$, 0.1–0.9% $ZnO$, 3–6% $TiO_2$, 0.03–0.5% $V_2O_5$, 0.1–1% $Na_2O$, 0–1% $K_2O$, 0–2% $CaO$, 0–2% $BaO$, 0–2% $PbO$, 0–2% $As_2O_3$, 0–3% $ZrO_2$, and 0–3% $P_dO_5$. The article is produced by forming a desired shape of glass article having the ingredients, heating the glass article at a temperature of 650°–800° C. to nucleate in the glass, heating the glass article at a temperature of 800°–950° C. to thereby precipitate $\beta$-quartz solid solution crystals alone in the glass, and cooling the article to the room temperature.

1 Claim, 1 Drawing Sheet

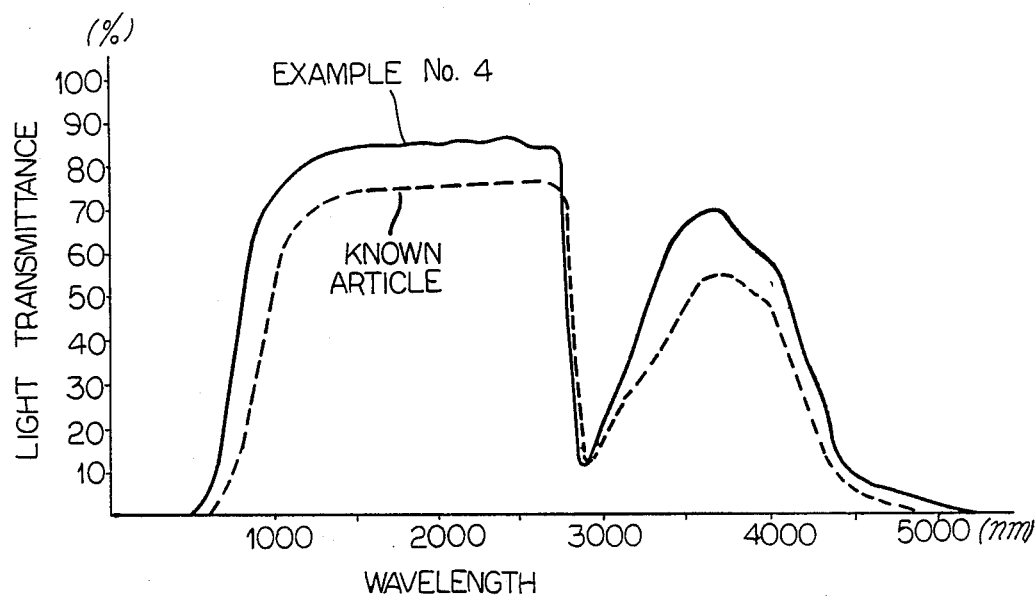

INFRARED TRANSPARENT GLASS CERAMIC ARTICLES WITH BETA-QUARTS SOLID SOLUTION CRYSTALS WITHOUT ANY OTHER CRYSTALS

BACKGROUND OF THE INVENTION:

(1) Field of the Invention

The present invention relates to infrared transparent glass ceramic articles, and in particular, to such glass ceramic articles useful for top plates of cooking stoves and to a production method thereof.

(2) Description of the Prior Art

It is known in the prior art to use a crystallization glass for top plates of cooking stoves.

U.S. Pat. No. 4,211,820 by Cantaloupe et al discloses such a glass ceramic sheet useful as surfaces for smooth-top cooking stoves which consists essentially, by weight, of 2.5–4.5% $Li_2O$, 1–2% MgO, 1–2% ZnO, 19.5–21% $Al_2O_3$, 66.5–68% $SiO_2$, 4–5% $TiO_2$, and 0.02–0.2% $V_2O_5$, the total of these ingredients being 98% or more.

The glass ceramic sheet, in thickness of about 5mm, will display a warm brown coloration and a transmittance of about 20–60% when measured at 800nm.

The glass ceramic sheet is also characterized by a surface layer containing β-quartz solid solution crystals and an interior containing β-spodumene solid solution crystals dispersed within a glassy matrix. The development of these two crystals improves the mechanical strength of the sheet, because the former has a thermal expansion coefficient lower than that of the latter to thereby cause surface reinforcement of the sheet.

However, the development of β-spodumene solid solution crystals tend to unadvantageously cloud the ceramic article white. The white clouded glass ceramic sheet has a problem in appearance and has a reduced infrared transmittance so that a heating element of a cooking stove cannot be observed through the glass ceramic sheet. Therefore, the use of the ceramic sheet for cooking stoves may be unsafe for operators of the stoves.

SUMMARY OF THE INVENTION

IT is an object of the present invention to provide an infrared transparent glass ceramic article consisting of β-quartz solid solution crystals alone dispersed within a glass matrix and displaying, in thickness of 3mm, a dark or black appearance, a transmittance of about 5% or less for a visible light of a wavelength of 500nm or less, and a transmittance of about 80% or more for an infrared light of a wavelength of 1,500nm, as well as having a bending strength of 20,000 psi or more.

It is another object of the present invention to provide a method for producing the infrared transparent glass ceramic article.

A glass ceramic articles of the present invention consists essentially, by weight, of 60–72% $SiO_2$, 14–28% $Al_2O_3$, 2.5–5.5% $Li_2O$, 0.1–0.9% MgO, 0.1–0.9% ZnO, 3–6% $TiO_2$, 0.03–0.5% $V_2O_5$, 0.1–1% $Na_2O$, 0–1% $K_2O$, 0–2% CaO, 0–2% BaO, 0–2% PbO, 0–2% $As_2O_3$, 0–3% $ZrO_2$, and 0–3% $P_2O_5$. The glass ceramic article has a bending strength of 20,000 psi or more, and consists of β-quartz solid solution crystals alone dispersed within a glass matrix. The glass ceramic article is characterized by, in thickness of 3mm, a black appearance, a visible light transmittance of about 5% or less for a light of a wavelength of 500nm or less but an infrared transmittance of about 80% for an infrared light of 1,500nm wavelength.

An amount of $SiO_2$ is limited with a range of 60–72 wt.%. When $SiO_2$ is below 60%, a thermal expansion coefficient is excessively increased and a mechanical strength is reduced. When $SiO_2$ is more than 72%, the glass is hardly melted.

$Al_2O_3$ less than 14 wt.% reduces the chemical resistance of the glass and makes the glass devitrifyable. When $Al_2O_3$ exceeds 28 wt.%, the glass is excessively hard and a homogeneous glass cannot be obtained. Therefore, $Al_2O_3$ is 14 wt.% at minimum and 28 wt.% at maximum.

An amount of $Li_2O$ is restricted within a range of 2.5–5.5%. When $Li_2O$ is less than 2.5%, a thermal expansion coefficient is excessively raised and the ceramic becomes cloudy due to development of β-spodumene crystals. When $Li_2O$ is more than 5.5%, devitrification is progressed so that no homogeneous ceramic article can be obtained.

When each of MgO and ZnO is less than 0.1 wt.%, darkness is weakened and the visible light transmittance is increased. Use of more than 0.9 wt.% increases devitrification and generates a white cloud in the ceramic article due to development of β-spodumene crystals, so that the infrared transmittance is lowered.

Use of $TiO_2$ less than 3 wt.% develops insufficient crystallization, while use of $TiO_2$ more than 6 wt.% progresses devitrification so that a homogeneous ceramic cannot be obtained.

$Li_2O$, ZnO and MgO of the above-restricted amounts are important for obtaining the high bending strength of 20,000 psi or more.

$V_2O_5$ is an element for darkening the ceramic articles. In use of $V_2O_5$ below 0.03 wt.%, a visible light transmittance is unadvantageously increased, and in use of it above 0.5 wt.%, the infrared transmittance is reduced.

When $Na_2O$ is used below 0.1 wt.%, the ceramic has a numerous crystals precipitated in the surface layer and therefore dissipated the surface brilliance. Use of more than 1.0 wt.% $Na_2O$ weakens crystallization and excessively increases the thermal expansion coefficient.

In addition to those ingredients $SiO_2$, $Al_2O_3$, $Li_2O_3$, MgO, ZnO, $TiO_2$, $V_2O_5$, and $Na_2O$, optional elements of $K_2O$ of up to 1 wt.%, CaO of up to 2 wt.%, BaO of up to 2 wt.%, PbO of up to 2 wt.%, $As_2O_3$ of up to 2 wt.%, $ZrO_2$ of up to 3 wt.%, and $P_2O_5$ of up to 3 wt.% can be contained in the ceramic alone or in combination, inasmuch as the high infrared transmittance is maintained.

Coloring elements such as $Fe_2O_3$, MnO, NiO, CoO, $Cr_2O_3$, $CeO_2$ and others should not be added because they reduce the infrared transmittance.

The glass ceramic article is produced by forming a desired shape of glass article comprising the above-described ingredients, heating the glass article at a temperature of 650–800° C. for a time period sufficient to develop nucleation in the glass, heating the glass article at a temperature of 800–950° C. for a time period to develop crystal growth in the glass, to thereby precipitate β-quartz solid solution crystals alone within a glassy matrix, and cooling the article to the room temperature.

It is important for the high infrared transmittance to strictly control the temperature and the time period in each of the nucleation and crystal growth heating steps. In the nucleation step, nucleation is not normally performed at a heating temperature out of the range of 650-800° C., so that the crystal growth cannot normally be carried out in the subsequent crystallization step.

For the nucleation, the heating temperature is preferably maintained for 0.5-3 hours.

In the crystallization step, use of a heating temperature below 800° C. requires an excessive and uneconomical long time period for crystal growth. On heating at a temperature higher than 950° C., β-spodumene crystals develop and the ceramic is, therefore, white cloudy and has a reduced infrared transmittance.

For crystal growth, the heating temperature is preferably maintained for 0.5-5 hours.

BRIEF DESCRIPTION OF THE DRAWINGS

A single figure graphically illustrates transmittance-to-wavelength characteristics of a known glass ceramic article and an example of the present invention.

DETAILED DESCRIPTION OF THE PREFERRED EMBODIMENTS

Briefly stating, the present invention attempts to add 0.03-0.5 wt.% $V_2O_5$, 0.1-0.9 wt.% ZnO, 0.1-0.9 wt.% MgO, and 0.1-1 wt.% $Na_2O$ in a $SiO_2$-$Al_2O_3$-$Li_2O$ glass and to heat-treat the glass for crystallization under a strict temperature and time period control, so as to realize the above-described object.

Ten examples of the present invention are demonstrated in the following Tables 1 and 2. In the Tables 1 and 2, composition of each example is shown together with temperatures and time periods in each heat treatment step, different light transmittance, and a bending strength.

TABLE 1

| | Examples No. | | | | |
|---|---|---|---|---|---|
| | 6 | 7 | 8 | 9 | 10 |
| Ingredients (wt. %) | | | | | |
| $SiO_2$ | 63.0 | 65.0 | 69.0 | 68.0 | 68.0 |
| $Al_2O_3$ | 26.0 | 22.3 | 19.0 | 20.0 | 21.0 |
| $Li_2O$ | 5.3 | 4.6 | 4.0 | 5.0 | 3.0 |
| MgO | 0.1 | 0.9 | 0.5 | 0.5 | 0.8 |
| ZnO | 0.8 | 0.1 | 0.4 | 0.5 | 0.5 |
| $TiO_2$ | 4.6 | 5.7 | 5.0 | 4.6 | 4.8 |
| $V_2O_5$ | 0.1 | 0.4 | 0.1 | 0.1 | 0.02 |
| $Na_2O$ | 0.1 | 0.7 | 1.0 | 0.2 | 0.2 |
| $K_2O$ | | | | 0.1 | 0.5 |
| CaO | | | | | |
| BaO | | 0.3 | | | |
| PbO | | | | | |
| $As_2O_5$ | | | 1.0 | 1.0 | 1.0 |
| $ZrO_2$ | | | | | |
| $P_2O_5$ | | | | | |
| Heat Treating Steps | | | | | |
| Nucleation | | | | | |
| Temperature (°C.) | 680 | 700 | 720 | 730 | 700 |
| Time period (hr) | 2 | 2 | 1 | 2 | 1 |
| Crystal Growth | | | | | |
| Temperature (°C.) | 800 | 850 | 850 | 850 | 870 |
| Time period (hr) | 2 | 1 | 1 | 1 | 1 |
| Transmittance (%) | | | | | |
| 500 nm (Visible light) | 1 | 0 | 0 | 0 | 0 |
| 1500 nm (Infrared light) | 83 | 81 | 88 | 85 | 85 |
| Bending Strength (psi) | 35500 | 54000 | 42600 | 64000 | 56800 |

TABLE 2

| | Examples No. | | | | |
|---|---|---|---|---|---|
| | 6 | 7 | 8 | 9 | 10 |
| Ingredients (wt. %) | | | | | |
| $SiO_2$ | 66.0 | 66.0 | 66.0 | 66.0 | 65.5 |
| $Al_2O_3$ | 22.0 | 22.0 | 22.0 | 22.0 | 22.0 |
| $Li_2O$ | 4.2 | 4.2 | 4.2 | 4.2 | 4.2 |
| MgO | 0.5 | 0.5 | 0.5 | 0.5 | 0.8 |
| ZnO | 0.5 | 0.5 | 0.5 | 0.5 | 0.1 |
| $TiO_2$ | 4.2 | 4.2 | 4.2 | 3.2 | 3.9 |
| $V_2O_5$ | 0.1 | 0.1 | 0.1 | 0.1 | 0.05 |
| $Na_2O$ | 0.5 | 0.5 | 0.5 | 0.5 | 0.4 |
| $K_2O$ | | | | | 0.25 |
| CaO | 1.0 | | | | 1.5 |
| BaO | | 1.0 | | | |
| PbO | | | 1.0 | | |
| $As_2O_5$ | 1.0 | 1.0 | 1.0 | 1.0 | 1.3 |
| $ZrO_2$ | | | | 1.0 | |
| $P_2O_5$ | | | | 1.0 | |
| Heat Treating Steps | | | | | |
| Nucleation | | | | | |
| Temperature (°C.) | 720 | 720 | 720 | 700 | 700 |
| Time period (hr) | 2 | 2 | 2 | 3 | 2 |
| Crystal Growth | | | | | |
| Temperature (°C.) | 850 | 850 | 900 | 850 | 870 |
| Time period (hr) | 1 | 1 | 1 | 2 | 1 |
| Transmittance (%) | | | | | |
| 500 nm (Visible light) | 0 | 0 | 0 | 0 | 2 |
| 1500 nm (Infrared light) | 85 | 86 | 84 | 82 | 90 |
| Bending Strength (psi) | 42600 | 45400 | 42600 | 64000 | 45000 |

Those examples in the Tables 1 and 2 were produced by the following processes.

Raw materials, which are in states of oxide, hydroxide, halide, carbonate, nitrate, or others, were measured to form a batch, which, when melted together, will be converted into the desired oxide in each proper proportion as shown in the Tables 1 and 2. The batch ingredients were mixed together uniformly, and were melted in a platinum crucible within an electric furnace at a temperature of 1550-1620° C. for 16 hours. A glass rod of about 5mm in diameter was drawn from the molten glass, and the remainder of the molten glass was poured onto a carbon plate to form a glass plate of about 4mm in thickness using a stainless steel roll. Both were slowly cooled to the room temperature in an annealing furnace. The cooled glass rod was cut to form a sample rod of a 50mm length and the cooled glass plate was also cut to obtain a plate sample of 50×50×4mm.

Those rod and plate samples were loaded in an electric furnace with a heating temperature being elevated at a rate of 300° C./hour from the room temperature to the nucleation temperature range. The rod and plate samples were maintained at a nucleation temperature for a nucleation time period as described in the Tables 1 and 2. Then, the temperature was elevated at a rate of 80° C./hour to a crystal growth temperature and maintained at the crystal growth temperature for a crystal growth time period as described in the Tables 1 and 2, and thereafter, were slowly cooled to the room temperature.

The resultant rod and plate glass ceramic samples were observed to have a dark or black and brilliant appearance without any white cloud and a smooth surface.

The rod sample was subjected to a conventional three-point bending test. Bending strength of 35,500-64,000 psi was measured for the examples as described in the Tables 1 and 2.

The plate sample was polished to become about 3mm in thickness and was subjected to a measurement of transmittance by use of a spectrophotometer. A transmittance was measured about 80% or more for an infrared light of a 1500nm wavelength, but a visible light transmittance was almost 0%, as shown in the Tables 1 and 2.

The single figure illustrates light transmittance-to-wavelength characteristics of example No. 4 of the present invention and a known glass ceramic article.

The known glass ceramic articles consisted, by weight, of 67.5% $SiO_2$, 20.0% $Al_2O_3$, 4.1% $Li_2O$, 17.5% MgO, 1.25% ZnO, 4.5% $TiO_2$, 0.1% $V_2O_5$, 0.2% $Na_2O$, 0.1% $K_2O$, and 0.5% $As_2O_3$, and was produced by processes similar to the examples of the present invention.

It was appreciated from analysis of crystalline structure that the example of the present invention consisted of $\beta$-quartz solid solution crystals alone dispersed in a glassy matrix while the known glass ceramic having $\beta$-spodumene crystals in addition to $\beta$-quartz solid solution crystals.

It was also observed that the example of the present invention displays a uniformly black appearance but the known ceramic having a white cloud.

The figure shows that the example of the present invention has an infrared transmittance higher than that of the known glass ceramic.

What is claimed is:

1. An infrared transparent glass ceramic article having a bending strength of 20,000 psi or more, displaying, in thickness of about 3mm, a transmittance of about 5% or less for visible light of a wavelength of 500nm or less but a transmittance of about 80% or more for an infrared light of a wavelength of 1,500nm, and a dark or black appearance, and consisting of a glassy matrix and $\beta$-quartz solid solution crystals substantially alone dispersed within the glassy matrix, said glass ceramic article being free from $Fe_2O_3$ and consisting essentially, by weight, of 60–72% $SiO_2$, 14–28% $Al_2O_3$, 2.5–5.5% $Li_2O$, 0.1–0.9% MgO, 0.1–0.9% ZnO, 3–6% $TiO_2$, 0.03–0.2% $V_2O_5$, 0.1–1% $Na_2O$, 0–1% $K_2O$, 0–2% BaO, 0–2% PbO, 0–2% $As_2O_3$, 0–3% $ZrO_2$, and 0–3% $P_2O_5$.

* * * * *